(12) United States Patent
Vorwerk et al.

(10) Patent No.: US 11,136,122 B2
(45) Date of Patent: Oct. 5, 2021

(54) ARRANGEMENT AND METHOD WITH A FLYABLE UNMANNED TRANSPORTING DEVICE

(71) Applicant: Deutsche Post AG, Bonn (DE)

(72) Inventors: Felix Vorwerk, Bonn (DE); Matthäus Pruski, Troisdorf (DE); Paul Muller, Frechen (DE)

(73) Assignee: Deutsche Post AG, Bonn (DE)

( * ) Notice: Subject to any disclaimer, the term of this patent is extended or adjusted under 35 U.S.C. 154(b) by 360 days.

(21) Appl. No.: 16/252,824

(22) Filed: Jan. 21, 2019

(65) Prior Publication Data
US 2019/0225337 A1 Jul. 25, 2019

(30) Foreign Application Priority Data
Jan. 22, 2018 (DE) .......................... 10 2018 101 315

(51) Int. Cl.
*B64D 9/00* (2006.01)
*B64C 39/02* (2006.01)
*B64F 1/00* (2006.01)
*G06Q 10/08* (2012.01)

(52) U.S. Cl.
CPC .............. *B64D 9/00* (2013.01); *B64C 39/024* (2013.01); *B64F 1/00* (2013.01); *G06Q 10/083* (2013.01); *B64C 2201/128* (2013.01)

(58) Field of Classification Search
CPC ......... B64C 2201/182; B64C 2201/208; B64F 1/007; B64F 1/125; B64F 1/0297; B64F 1/02; B64F 1/16
See application file for complete search history.

(56) References Cited

U.S. PATENT DOCUMENTS

| 4,123,020 A | 10/1978 | Korsak | |
| 9,434,481 B2 * | 9/2016 | McGeer | B64F 1/0299 |
| 9,505,493 B2 * | 11/2016 | Borko | B64F 1/12 |
| 9,701,425 B2 | 7/2017 | Lee | |

(Continued)

FOREIGN PATENT DOCUMENTS

| KR | 10-2013-0122715 | 8/2013 |
| KR | 3 124 381 A1 | 1/2017 |

(Continued)

OTHER PUBLICATIONS

Search Report Issued in related European Application No. 19153442.9 dated Mar. 28, 2019.

(Continued)

*Primary Examiner* — Richard R. Green
*Assistant Examiner* — Madison Elizabeth Dittner
(74) *Attorney, Agent, or Firm* — Woodard, Emhard, Henry, Reeves & Wagner, LLP

(57) ABSTRACT

The disclosure relates to an arrangement comprising a flyable unmanned transporting device and a movable catch arm, which is provided at a ground station, for holding the transporting device at the ground station, wherein at least one recess is provided on the transporting device, and the catch arm, at its end facing away from the ground station, has at least one expansion element which can be introduced into the at least one recess and, in the introduced state, can be expanded in order to produce a form fit between the at least one recess and the at least one expansion element.

20 Claims, 3 Drawing Sheets

(56) References Cited

U.S. PATENT DOCUMENTS

| | | |
|---|---|---|
| 2009/0238470 A1 | 9/2009 | Goossen |
| 2009/0314883 A1* | 12/2009 | Arlton .................... F41A 23/34 244/63 |
| 2017/0021923 A1 | 1/2017 | Fisher |
| 2018/0370653 A1* | 12/2018 | Fujita .................... B64C 39/024 |

FOREIGN PATENT DOCUMENTS

| | | |
|---|---|---|
| WO | WO 2006/105587 A1 | 10/2006 |
| WO | WO 2016/130112 A1 | 8/2016 |
| WO | WO 2017/221235 A1 | 12/2017 |

OTHER PUBLICATIONS

Office Action and Translation issued in related DE102018101315.9 dated Dec. 25, 2018 (pp. 16).

\* cited by examiner

ARRANGEMENT AND METHOD WITH A FLYABLE UNMANNED TRANSPORTING DEVICE

TECHNICAL FIELD

The invention relates to an arrangement with a flyable unmanned transporting device and a movable catch arm, which is provided at a ground station, for holding the transporting device at the ground station. In addition, the invention relates to a method for holding the flyable unmanned transporting device at the ground station by the movable catch arm which is provided at the ground station.

BACKGROUND OF THE INVENTION

As a result of increasing transportation of goods by single-item and consolidated-freight journeys, transporting operations by lorry or container, ocean-cargo or air-freight package transporting operations in the area of e-commerce and online mail-order business, the number of transported goods, and in particular parcel deliveries, consignments or other transportable goods, referred to in general below as objects, has significantly increased. Although it is possible nowadays to place an order online independently of conventional store opening times, the delivery of the object to the recipient almost always takes place by means of traditional delivery methods, for example by postman, or, in the case of parcel deliveries, by motorized delivery vehicles, and essentially only within store opening hours. If the recipient cannot be found when the object is delivered, for example because, as a person who has a job, he or she is at work during delivery times, it is attempted either to deliver the object at another time or the object is left at a branch of the delivery company to be picked up by the recipient.

Attempts have therefore recently been made to deliver objects to the recipient, a ground station or to a compartment system apparatus as collecting point, for example to a DHL Packstation installed in a public space for a municipality for a plurality of recipients or in the front garden of a house of the recipient, by means of unmanned flyable transporting devices, for example by a flyable unmanned aircraft, also known as a parcelcopter, cargo drone or drone for short. The object can be removed from the compartment system apparatus or inserted therein outside store opening times or delivery times. In the aforementioned attempts, the actual transfer of the object from the transporting device to the ground station or compartment system apparatus has proven to be particularly difficult. For example, "jettisoning" of the object from the transporting device onto the ground station or compartment system apparatus is generally not possible, since it may result in damage to fragile objects.

In order to satisfy high safety standards and to avoid possible damage and accidents, cargo drones in future are intended to land only on "drone ports" provided for this purpose as ground stations, and therefore the object can only be transferred at said drone ports. However, the problem of compatibility arises at such drone ports: a drone port, similarly to an airport or heliport, is intended to be compatible with as large a number of different types of drone as possible and is intended to fix said drones securely at the drone port during loading and unloading.

DESCRIPTION OF THE INVENTION

Starting from this situation, it is an object of the present invention to specify an arrangement and a corresponding method in order to transfer an object in a particularly simple and secure manner between an unmanned flyable transporting device and a ground station.

The object of the invention is achieved by the features of the independent claims. Advantageous refinements are specified in the dependent claims.

Accordingly, the object is achieved by an arrangement comprising a flyable unmanned transporting device and a movable catch arm, which is provided at a ground station, for holding the transporting device at the ground station, wherein at least one recess is provided on the transporting device, and the catch arm, at its end facing away from the ground station, has at least one expansion element which can be introduced into the at least one recess and, in the introduced state, can be expanded in order to produce a form fit and/or a force fit between the at least one recess and the at least one expansion element.

An essential point of the invention consists in that the transporting device "can be captured" in a simple manner by means of the catch arm and can be fixed to the ground station by means of the expansion element in order to be able to transfer objects between the transporting device and the ground station in a secure manner. In addition, the catch arm permits transporting devices of a wide variety of types to be held, as is explained in more detail below. Finally, unlike configurations known from the prior art, the transporting device does not require any type of landing skid, runners or the like in order to be able to land independently on the ground station. This is because the proposed catch arm and the expansion element make it possible to dispense with landing of the transporting device on the ground station as is otherwise necessary in the prior art. Instead, the catch arm permits the simple and rapid "capturing" of the transporting device even during flight in a region surrounding the ground station that is defined by a maximum extension of the catch arm.

Since the transporting device, as previously described, does not require any landing skid, runners or the like for landing on the ground station, transporting devices having a lower dead weight and correspondingly higher load-bearing capability and/or range than transporting devices known from the prior art can be used for the proposed arrangement and the method described below. In one conceivable use, the catch arm moves synchronously with the transporting device approaching the ground station and/or approaches the transporting device by extraction of the catch arm. By means of further extraction of the catch arm, the expansion element is introduced into the recess and expanded in the introduced state in order to produce a form fit and/or force fit between the recess and the expansion element. The catch arm then contracts in order to deposit the transporting device on the ground station, and therefore, as a result, objects can be transferred between the ground station and the transporting device.

The transporting device is preferably designed as a flying device, as an unmanned aircraft, as an "unmanned, uninhabited or unpiloted aerial vehicle", UAV for short, as a parcelcopter, cargo drone or as a drone. Possible embodiments of the transporting device may be a helicopter, multicopter, quadrocoptor or tilt wing, to mention just a few possibilities. The transporting device and/or the ground station preferably have mechanical and/or information technology devices, which enable the transporting device and/or the ground station to carry out a method described below, in particular to carry out the method automatically and/or autonomously. The transporting device and/or the ground station may have a microprocessor, a control device and/or a programmable controller, which have a software program for carrying out the method steps and/or communication devices for wire-bound and/or wireless communication between the transporting device and the ground station. The transporting device is preferably designed in order to be able to approach the ground station and/or move away therefrom in the vertical direction.

The catch arm can therefore be used not only for holding the transporting device but, for example, also for pulling up and depositing the transporting device at and/or on the ground station and for raising, launching and/or accelerating the transporting device away from the ground station. The expansion element is preferably introduced into the recess by means of a vertical movement. The introduced state is present in particular when the expansion element has been completely introduced into the recess and/or when that end of the catch arm which faces away from the ground station lies in contact against the recess and/or the transporting device. An end of the catch arm that faces the ground station is preferably fastened movably to the ground station. In addition, the catch arm makes it possible to use transporting devices which have only limited accuracy of, for example, three meters, when flying towards the ground station: as soon as the transporting device has reached, for example, three meters into the region surrounding said ground station, the transporting device can be "captured" by the catch arm and deposited at the ground station. By expansion of the at least one expansion element in the introduced state, the transporting device can be fixed, for example in the horizontal direction, in relation to the ground station.

According to a preferred development, the catch arm, at its end facing away from the ground station, has a plurality of expansion elements which can be arranged variably in their distance from one another at the end. The distance between two expansion elements is, for example, 60, 70 or 80 cm. Two, three, four, five or more expansion elements which are arranged in particular at equal distances from one another, in one row and/or in a plurality of parallel rows at the end, are preferably provided. Furthermore preferably, a rail on which the plurality of expansion elements are displaceably arranged is provided at the end. Particularly preferably, a drive, by means of which the distance of the expansion elements from one another can be changed, is provided at the end. Very particularly preferably, the catch arm is configured such that, in particular by means of the drive, the distance between the expansion elements is automatically adapted to a transporting device approaching the ground station. By varying the distance, the expansion elements or the catch arm can be connected to different types of transporting devices.

The object of the invention is furthermore achieved by a method for holding a flyable unmanned transporting device at a ground station by a movable catch arm provided at the ground station, wherein at least one recess is provided on the transporting device, and the catch arm, at its end facing away from the ground station, has at least one expansion element, comprising the following steps:

introducing the at least one expansion element into the at least one recess, and expanding the at least one expansion element in the introduced state in order to produce a form fit and/or a force fit between the at least one recess and the at least one expansion element.

By means of the proposed method, transporting devices of widely differing configurations without a landing skid, runners or the like can land at the ground station in a secure and simple manner by means of the catch arm and can be launched from said ground station, as a result of which the ground station becomes "multi-drone-capable". Since the transporting devices do not require any landing skid, runners or the like, the aerodynamic properties of the transporting devices are improved and the load-bearing capability and range of the transporting devices are increased. In addition, the transporting devices can also be launched again from the ground station by means of the catch arm, and therefore a partially manual alignment of the transporting devices at the ground station in a launch position as is otherwise necessary in the prior art is omitted. Finally, after production of the form fit and/or a force fit, the transporting device can be reliably fixed at the ground station by means of the catch arm, and therefore tipping over of the transporting device due to wind gusts or the like is avoided and secure loading and unloading of the transporting device is possible.

According to a preferred development of the method, the catch arm, at its end facing away from the ground station, has a plurality of expansion elements, and the method has the following step: arranging the plurality of expansion elements at the end in a manner corresponding to a plurality of recesses. The arrangement preferably takes place in an automated manner with respect to the distances between the plurality of recesses of the transporting device. Furthermore preferably, a camera or detection unit which can identify the distance between the plurality of recesses and, accordingly, arranges the plurality of expansion elements at the end in a manner corresponding to the plurality of recesses is provided on the catch arm.

According to yet another preferred development, the method has the following step: aligning the at least one expansion element during a flight and/or a landing of the transporting device with respect to the at least one recess, and/or, after producing the form fit and/or the force fit, aligning the transporting device relative to the ground station by the catch arm. According to this development, the alignment of the at least one expansion element already takes place, for example, as the transporting device approaches the ground station. For this purpose, the transporting device approaching the ground station can be in communication connection with the ground station and can transmit appropriate information for aligning the at least one expansion element to the ground station during the flight. Similarly, information of this type can be transmitted, for example, from a logistic center to the ground station. By alignment of the transporting device relative to the ground station, the transporting device can be transferred into a loading and unloading position and/or can be rotated in a wind direction for launching. In addition, it is conceivable for the transporting device to be positioned by means of the catch arm for exchanging a battery of the transporting device at a battery exchange device of the ground station.

According to another preferred development, the method has the following step: detecting a wind speed and/or wind direction at the ground station and aligning the at least one expansion element with respect to the at least one recess depending on the detected wind speed and/or wind direction. For detecting the wind speed and/or the wind direction, one or more anemometers can be provided at the ground station and are furthermore preferably arranged at a perimeter of the ground station. By means of the previously mentioned camera or detection unit, which can likewise be provided at the ground station, a position of the transporting device relative to the ground station can be detected in order, depending on the detected position, to align the catch arm relative to the transporting device so as to be able to introduce the at least one expansion element more accurately into the at least one recess. In addition, by detecting the wind speed and/or the wind direction, the wind-influenced position of the transporting device relative to the ground station can be worked out in advance and an alignment of the at least one expansion element adapted to the influenced position.

According to yet another development, the expansion comprises inflating the at least one expansion element, and/or the method has the following step: contracting the at least one expansion element in order to release the form fit and/or the force fit. According to a preferred development of the arrangement or of the method, the at least one expansion element is configured to be inflatable, and/or the at least one recess is provided on a lower side of the transporting device. The inflation can take place by means of compressed air, and therefore tolerances between the at least one expansion element and the at least one recess can be compensated for and/or a form fit can be produced. Expanding of the expansion element introduced into the recess makes it possible to fix the transporting device on the catch arm without damage. The fixing can be canceled by contracting the expansion element, for example after escape of the compressed air previously blown into the latter.

According to another preferred development of the arrangement or of the method, a plurality of recesses which are spaced apart from one another are provided on the transporting device, and the catch arm, at its end facing away from the ground station, has a plurality of expansion elements which are spaced apart from one another. The plurality of expansion elements are preferably arranged in a manner corresponding to the plurality of recesses. By means of a plurality of expansion elements and recesses, the transporting device can be fixed to the ground station in a particularly positionally secure manner.

In principle, the recess and/or the expansion element can be configured as desired in order, after the introduction and the expansion, to form the form fit and/or the force fit. According to a particularly preferred development of the arrangement or of the method, the at least one recess is designed as a sleeve and/or the at least one expansion element is designed as a spike. The expansion element or the spike is preferably designed in order, in the expanded state, to lie in a touching and/or form-fitting manner against the recess or the sleeve. The recess can also be designed as a cutout or bore.

According to a further preferred development of the arrangement or of the method, the at least one recess has a funnel-like opening for the introduction of the at least one expansion element. In the region of the funnel-like opening, the at least one recess preferably has a larger diameter which tapers as the depth of the recess increases. By means of the funnel-like opening, the introduction of the at least one expansion element into the at least one recess is facilitated.

According to another preferred development of the arrangement or of the method, the at least one recess is extended in profile in a keyhole-like and/or cavity-like manner from an opening facing away from the transporting device towards the transporting device. The keyhole-like extension is preferably designed as a cavity. By expansion of the expansion element in the keyhole-like and/or cavity-like extension, the force fit can be produced between the at least one recess and the at least one expansion element, and therefore the transporting device is fixed, for example in the vertical direction, in relation to the ground station. In the region of the keyhole-like and/or cavity-like extension, the recess has a larger diameter which tapers towards the opening and optionally increases again in order to form the funnel-like opening.

In this connection, it is preferred if at least one air outlet is provided in the keyhole-like and/or cavity-like extension. By means of the air outlet designed, for example, as a venting hole, air can flow out of the keyhole-like and/or cavity-like extension during the expansion of the expansion element and/or can flow into same during the contraction. A plurality of air outlets which are arranged spaced apart on the keyhole-like and/or cavity-like extension are preferably provided.

According to another preferred development of the arrangement or of the method, the catch arm is designed to be changeable in height or horizontally and/or to be rotatable, and/or has at least one rotatable joint. The catch arm is preferably designed in the manner of a crane arm which is connected at its end facing the ground station to the ground station by means of a first joint. Via a second joint, the at least one expansion element can be connected pivotably to the catch arm at that end thereof which faces away from the ground station. A single joint or a plurality of joints can be provided between the first and the second joint so that the catch arm can move in a region surrounding the ground station. The catch arm is preferably configured such that it can be extended, unfolded and/or stretched out and, in its completely stretched-out state, extends between the first and the second joint, for example, over a distance of 3, 4, 5, 7 or more meters.

There are basically various possibilities for configuring the ground station. According to a particularly preferred development of the arrangement or of the method, the ground station is designed as a compartment system apparatus, as a receiving container, as a vehicle, a building and/or a mast. Furthermore preferably, the ground station is designed as a packing station and/or is provided in a public environment, for example at an edge of a road, or in a private environment, for example in a front garden or on a roof of a building. The vehicle can be designed as a delivery van or lorry, on the loading platform of which the catch arm is arranged.

BRIEF DESCRIPTION OF THE DRAWINGS

The invention will be explained in more detail below using a preferred exemplary embodiment with reference to the attached drawing.

DETAILED DESCRIPTION OF THE DRAWINGS

Figure 1:
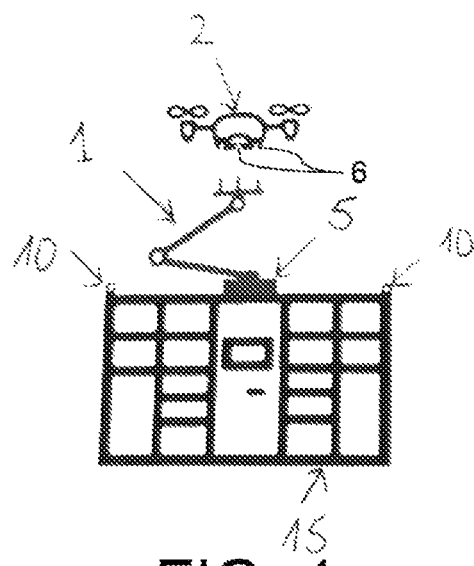
FIG. 1 shows a schematic view of an arrangement with a flyable unmanned transporting device and a ground station according to a preferred exemplary embodiment of the invention.
Figure 2:
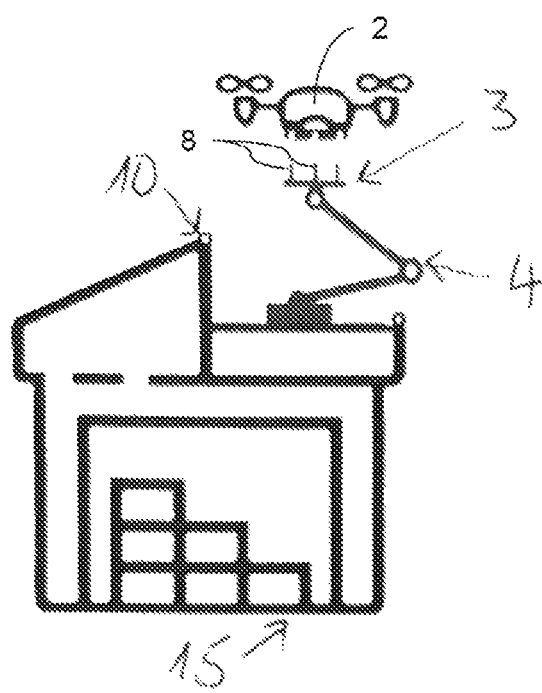
FIG. 2 shows a schematic view of a further arrangement with the flyable unmanned transporting device and a further ground station according to a further preferred exemplary embodiment of the invention.
Figure 3:
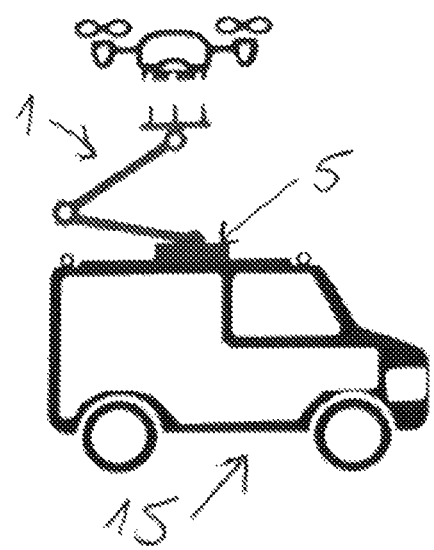
FIG. 3 shows a schematic view of a further arrangement with the flyable unmanned transporting device and a further ground station according to a further preferred exemplary embodiment of the invention.

FIGS. 1 to 3 show in respectively schematic views an arrangement comprising a flyable unmanned transporting device 2, which is designed as a drone, and a ground station 15 according to preferred exemplary embodiments of the invention. While the ground station 15 in FIG. 1 is designed as a compartment system, also referred to as packing station, FIG. 2 shows a building as the ground station 15 and FIG. 3 shows a vehicle as a mobile ground station. The ground station 15 can also be designed as a receiving container, a mast or the like.

A movable catch arm 1 which is fastened either fixedly or removably to the ground station 15 is provided at the ground station 15. An end of the catch arm 1 that faces the ground station 15 is fastened to the ground station via a landing device 5 for the transporting device 2 by means of a rotatable joint 4. The catch arm 1 which is formed from a metal has two further joints 4, and therefore an end 3 facing away from the ground station 15 can be changed in height and horizontally relative to the ground station 15 and is also rotatable. The joints 4 are arranged spaced apart from one another, wherein, at the end facing away from the ground station 15, a receiving device for receiving and holding the transporting device 2 is provided via one of the joints 4.

The ground station 15 has a controller (not shown) which, as the transporting device 2 flies towards the ground station 15, moves the receiving device of the catch arm 1 synchronously to the transporting device 2 in order, as described in more detail below, to connect the transporting device 2 to the receiving device 3 in a form- and force-fitting manner. For this purpose, the catch arm 1 by means of the receiving device 3 approaches a lower side of the transporting device 2 during the horizontal and/or vertical landing approach.

Figure 4:
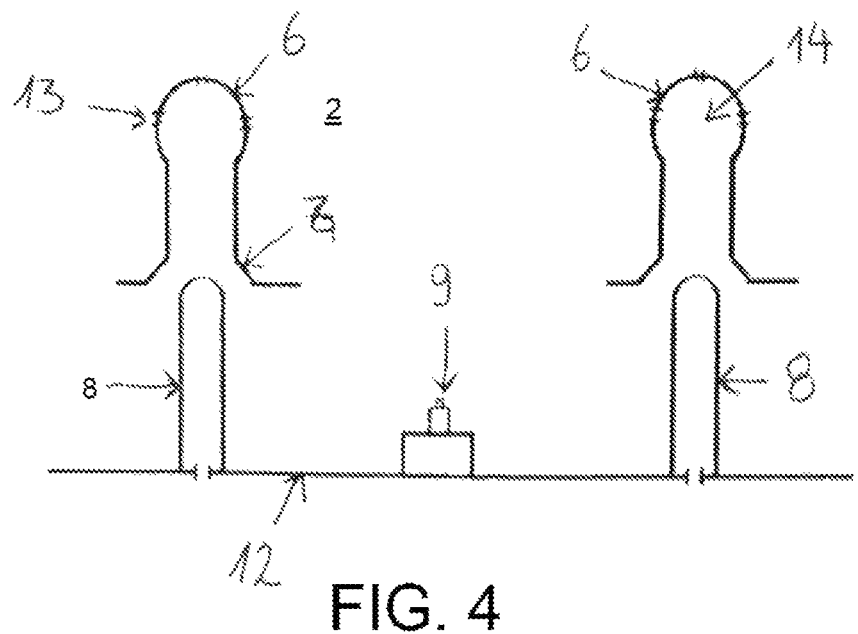
FIG. 4 shows a schematic partial view of the flyable unmanned transporting device and of a movable catch arm, which is provided at the ground station, according to the preferred exemplary embodiment of the invention.
Figure 5:
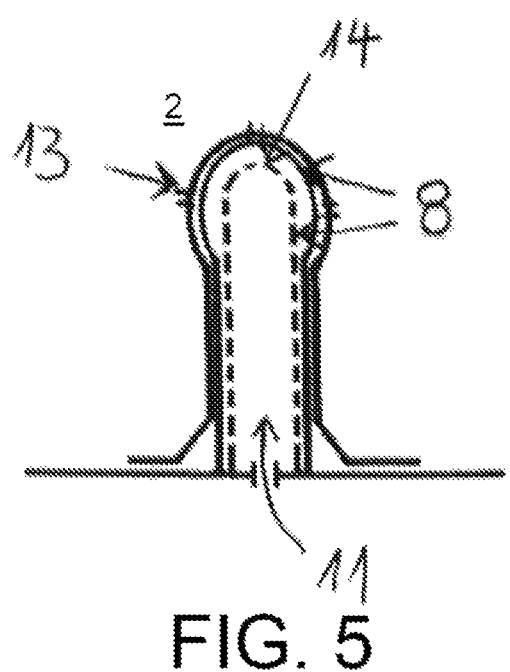
FIG. 5 shows a further schematic partial view of the flyable unmanned transporting device and of the movable catch arm, which is provided at the ground station, according to the preferred exemplary embodiment of the invention.

A plurality of recesses 6 which are sleeve- or keyhole-like in profile and are spaced apart from one another are provided on the lower side of the transporting device 2, as indicated in FIG. 1 and shown in enlarged form in FIGS. 4 and 5. The recesses 6 extend from a respective funnel-like opening 7 on the lower side of the transporting device 2 into the latter and expand in a keyhole-like manner to form a circle-like cavity 14 in profile. The diameter of the recesses 6 which are circle-like in section is initially reduced from the opening 7 in order then to increase again in the region of the cavity 14. While three recesses 6 are provided on the transporting device 2, FIG. 4 shows two recesses 6 and FIG. 5 one recess 6 in cross section.

In a manner corresponding to the recesses 6, a plurality of similarly spaced-apart spike-like expansion elements 8 are provided at the end 3, as indicated in FIG. 2 and shown in enlarged form in FIGS. 4 and 5. The expansion elements 8 are arranged at the end 3 on a rail 12 so as to be able to be arranged variably in their distance from one another. The expansion elements 8 can thus be introduced into recesses 6 at different distances from one another. The distance between the expansion elements 8 and correspondingly between the recesses 6 is 10 cm here, with other distances of 15 cm or 20 cm also being possible.

The distance between the expansion elements 8 can be adapted to the approaching transporting device 2 manually or automatically by means of a motor (not shown). The expansion elements 8 and the recesses 6 can be arranged in a row one behind another or in the manner of a triangle or in the manner of a square with respect to one another.

Between the expansion elements 8, a device 9 (only shown schematically) for unloading and loading the transporting device 2 is provided on the rail 12.

FIG. 4 shows a basic shape of the expansion elements 8, which are circular in section, in which said expansion elements have a uniform diameter along their extent. The expansion elements 8 are formed from a rubber-like material which can be expanded from the basic shape shown in FIG. 4 into the expansion shape shown in FIG. 5 by means of inflation by compressed air (the dashed line in FIG. 5 shows the basic shape). In the expanded state, the expansion element 8 lies in contact against the recess 6.

As soon as the expansion elements 8 are introduced into the recesses 6 by movement of the catch arm 1, as shown in FIG. 4, a force fit and form fit between the expansion elements 8 and the recesses 6 can be produced in the introduced state by expansion of the expansion elements 8, as shown in FIG. 5. This is because, on account of the expansion element 8 which is expanded in the cavity 14 and lies in contact against the recess 6, the transporting device is not only connected in a form-fitting manner but also in a force-fitting manner to the catch arm 1 and therefore to the ground station 15. So that air can escape from the recesses 6 during expansion of the expansion elements 8, a plurality of air outlets 13 are provided in the region of the keyhole-like extension. As a result, the transporting device 2 can be "captured" by the ground station 15 by means of the catch arm 1 and, by contraction of the catch arm 1, can be deposited on the landing device 5 of the ground station for unloading and loading by means of the device 9.

A sensor system in the form of a laser is provided at the end 3 of the catch arm 1, said sensor system identifying the distances between the recesses 6 on the transporting device 2 as the transporting device 2 approaches and adapting the distances between the expansion elements 8. In addition, the controller guides the end 3 of the catch arm 1 with the expansion elements 8 up to the transporting device 2 and finally into the recesses 6. In the introduced state, the controller causes the expansion of the expansion elements 8 by inflating same with compressed air, indicated by arrow 11, and contracts the catch arm 1 in order to deposit the transporting device 2 on the ground station 15.

After unloading and loading of the transporting device 2, the catch arm 1 is stretched out by means of the controller in order to raise the transporting device 2 from the ground station 15. The expansion elements 8 are contracted, and therefore the spike-like expansion elements 8 are released from the recesses 6 and the transporting device 2 can fly away from the ground station 15.

Furthermore, a plurality of anemometers 10 are provided on the ground station 15 in order to detect wind prevailing in the region of the ground station 15 and wind gusts. The controller takes into consideration a wind speed and wind direction, detected by the anemometers 10, during the aligning of the catch arm 1 relative to the approaching transporting device 2 and correspondingly corrects the position of the catch arm 1.

The exemplary embodiments described are only examples, which can be modified and/or supplemented in various ways within the scope of the claims. Each feature that has been described for a specific exemplary embodiment can be used independently or in combination with other features in any desired other exemplary embodiment. Each feature that has been described for an exemplary embodiment of a particular category can also be used in a corresponding manner in an exemplary embodiment of another category.

| List of Designations | |
|---|---|
| Catch arm | 1 |
| Transporting device | 2 |
| End | 3 |
| Joint | 4 |
| Landing device | 5 |
| Recess | 6 |
| Opening | 7 |
| Expansion element | 8 |
| Device | 9 |
| Anemometer | 10 |
| Arrow | 11 |
| Rail | 12 |
| Air outlet | 13 |
| Cavity | 14 |
| Ground station | 15 |

We claim:

1. An arrangement comprising a flyable unmanned transporting device and a movable catch arm, which is provided at a ground station, for holding the transporting device at the ground station, wherein at least one recess is provided on the transporting device, and the catch arm, at an end facing away from the ground station, has at least one expansion element which can be introduced into the at least one recess to enter into an introduced state and, in the introduced state, can be expanded, the expansion producing a form fit and a force fit between the at least one recess and the at least one expansion element.

2. The arrangement according to claim 1, wherein the catch arm, at the end facing away from the ground station, has a plurality of expansion elements which can be arranged variably in their distance from one another at the end.

3. The arrangement according claim 1, wherein the at least one expansion element is configured to be inflatable, and/or the at least one recess is provided on a lower side of the transporting device.

4. The arrangement according to claim 1, wherein a plurality of recesses which are spaced apart from one another are provided on the transporting device, and the catch arm, at its end facing away from the ground station, has a plurality of expansion elements which are spaced apart from one another.

5. The arrangement according to claim 1, wherein the at least one recess is designed as a sleeve and/or the at least one expansion element is designed as a spike.

6. The arrangement according to claim 1, wherein the at least one recess has a funnel shaped opening for the introduction of the at least one expansion element.

7. The arrangement according to claim 1, wherein the at least one recess is extended in profile in a keyhole shaped and/or cavity shaped manner from an opening facing away from the transporting device towards the transporting device.

8. A method for holding a flyable unmanned transporting device at a ground station by a movable catch arm provided at the ground station, wherein at least one recess is provided on the transporting device, and the catch arm, at an end facing away from the ground station, has at least one expansion element, comprising the following steps: introducing the at least one expansion element into the at least one recess to enter into an introduced state, and expanding the at least one expansion element in the introduced state, the expansion producing a form fit and a force fit between the at least one recess and the at least one expansion element.

9. The method according to claim 8, wherein the catch arm, at the end facing away from the ground station, has a plurality of expansion elements, and comprising the following step:
arranging the plurality of expansion elements at the end in a manner corresponding to a plurality of recesses.

10. The method according to claim 8, comprising the following step:
aligning the at least one expansion element during a flight and/or a landing of the transporting device with respect to the at least one recess, and/or after production of the form fit and/or of the force fit, aligning the transporting device relative to the ground station by means of the catch arm.

11. The method according to claim 8, comprising the following step:
detecting a wind speed and/or wind direction at the ground station and aligning the at least one expansion element with respect to the at least one recess depending on the detected wind speed and/or wind direction.

12. The method according to claim 8, wherein the expansion step comprises inflating the at least one expansion element, and/or comprising the following step:
contracting the at least one expansion element in order to release the form fit and/or the force fit.

13. The method according to claim 8, wherein the at least one expansion element is configured to be inflatable, and/or the at least one recess is provided on a lower side of the transporting device.

14. The method according to claim 8, wherein a plurality of recesses which are spaced apart from one another are provided on the transporting device, and the catch arm, at its end facing away from the ground station, has a plurality of expansion elements which are spaced apart from one another.

15. The method according to claim 8, wherein the at least one recess is designed as a sleeve and/or the at least one expansion element is designed as a spike.

16. The method according to claim 8, wherein the at least one recess has a funnel-like opening for the introduction of the at least one expansion element.

17. The method according to claim 8, wherein the at least one recess is extended in profile in a keyhole shaped and/or cavity shaped manner from an opening facing away from the transporting device towards the transporting device.

18. The method according to claim 17, wherein at least one air outlet is provided in the keyhole shaped and/or cavity shaped extension.

19. The method according to claim 8, wherein the catch arm is designed to be changeable in height or horizontally and/or to be rotatable, and/or has at least one rotatable joint.

20. An arrangement comprising a flyable unmanned transporting device and a movable catch arm, which is provided at a ground station, for holding the transporting device at the ground station, wherein at least one recess is provided on the transporting device, and the catch arm, at an end facing away from the ground station, has at least one expansion element which can be introduced into the at least one recess to enter into an introduced state and, in the introduced state, can be expanded in order to produce a form fit and/or a force fit between the at least one recess and the at least one expansion element, wherein the catch arm, at its end facing away from the ground station, has a plurality of expansion elements which can be arranged variably in their distance from one another at the end.

* * * * *